United States Patent
Barr, III et al.

(10) Patent No.: US 10,848,323 B2
(45) Date of Patent: Nov. 24, 2020

(54) EFFICIENT CERTIFICATE REVOCATION LIST VALIDATION IN MULTI-TENANT CLOUD SERVICES

(71) Applicant: MICROSOFT TECHNOLOGY LICENSING, LLC, Redmond, WA (US)

(72) Inventors: William Bruce Barr, III, Bellevue, WA (US); Radhika Kashyap, Seattle, WA (US); Svyatoslav Trukhanov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 15/987,939

(22) Filed: May 24, 2018

(65) Prior Publication Data

US 2019/0363895 A1    Nov. 28, 2019

(51) Int. Cl.
*H04L 9/32* (2006.01)
*H04L 29/08* (2006.01)
*H04L 9/06* (2006.01)
*H04L 9/00* (2006.01)
*H04L 29/06* (2006.01)

(52) U.S. Cl.
CPC .......... *H04L 9/3268* (2013.01); *H04L 9/006* (2013.01); *H04L 9/0643* (2013.01); *H04L 63/12* (2013.01); *H04L 67/2842* (2013.01)

(58) Field of Classification Search
CPC ....... H04L 9/3268; H04L 63/12; H04L 9/006; H04L 9/0643; H04L 67/2842; H04L 9/3236; H04L 63/0823; H04L 63/123
See application file for complete search history.

(56) References Cited

U.S. PATENT DOCUMENTS

| | | | | |
|---|---|---|---|---|
| 5,699,431 A * | 12/1997 | Van Oorschot | ....... | H04L 9/3268 380/30 |
| 5,793,868 A * | 8/1998 | Micali | ............ | H04L 9/3268 380/28 |
| 2002/0131594 A1* | 9/2002 | Hori | ............ | G06F 21/10 380/201 |
| 2005/0278534 A1* | 12/2005 | Nadalin | ........ | H04L 9/3263 713/175 |
| 2008/0133906 A1* | 6/2008 | Parkinson | ....... | H04L 9/3236 713/156 |
| 2009/0185677 A1* | 7/2009 | Bugbee | ........ | H04L 9/0841 380/28 |

(Continued)

*Primary Examiner* — Michael Pyzocha
(74) *Attorney, Agent, or Firm* — Rainier Patents, P.S.

(57) ABSTRACT

A CRL can be divided into a number of segments. The number of segments into which the CRL is divided can be determined by using a predefined number of serial numbers per segment. The segment in which a particular certificate is included can be determined by application of a consistent hashing algorithm to the serial number of the certificate to determine in which segment the serial number will be found if revoked, thereby increasing the efficiency of determining the revocation status of the certificate. Metadata common to each CRL can be cached on each server and on the remote cache. The segments themselves can be cached in the remote cache. Storing the segments only in the remote cache decreases resource consumption (e.g., amount of memory used in the local cache). Storing the segments in the remote cache enables optimization for locality.

20 Claims, 7 Drawing Sheets

(56) References Cited

U.S. PATENT DOCUMENTS

| | | | |
|---|---|---|---|
| 2009/0187983 A1* | 7/2009 | Zerfos | H04L 63/0823 |
| | | | 726/10 |
| 2009/0235071 A1* | 9/2009 | Bellur | H04W 12/04 |
| | | | 713/158 |
| 2010/0083347 A1* | 4/2010 | Hinton | H04L 9/3268 |
| | | | 726/1 |
| 2010/0138652 A1* | 6/2010 | Sela | G06F 21/445 |
| | | | 713/158 |
| 2010/0325419 A1* | 12/2010 | Kanekar | H04L 63/0823 |
| | | | 713/151 |
| 2015/0222643 A1* | 8/2015 | Sharif | H04L 63/0823 |
| | | | 713/155 |
| 2017/0317837 A1* | 11/2017 | Alrawais | H04L 9/3249 |

* cited by examiner

EFFICIENT CERTIFICATE REVOCATION LIST VALIDATION IN MULTI-TENANT CLOUD SERVICES

BACKGROUND

A public key infrastructure (PKI) is used to facilitate the secure electronic transfer of information across a network. PKI is used when passwords are not good enough to assure the identity of the parties involved. PKI employs the use of digital certificates and public key encryption. PKI binds a public key with the identity of an entity such as a person or an organization by the registration and issuance of a digital certificate. A digital certificate or public key certificate is an electronic document used to prove the ownership of a public key. The certificate typically includes information about the public key, the identity of the owner (subject) of the public key and the digital signature of the issuer of the certificate. The issuer of the certificate is responsible for verifying the contents of the certificate. If the signature is valid and the software examining the certificate trusts the issuer, the public key can be used to communicate securely with the owner of the certificate. Typically, the certificate issuer is a certificate authority (CA) or an agent thereof.

A Certificate Revocation List (CRL) is a list of digital certificates that have been revoked by the issuer (e.g., a certificate authority (CA) or agent thereof) before the scheduled expiration date for the certificate. A CRL can also include one or more certificates that are temporarily invalid because the certificate has been put on hold. Each entry in a CRL includes the serial number of the revoked certificate and the revocation date. A CRL is signed by the issuing CA to prevent tampering and to provide proof of the identity of the certificate owner. Optional information in the CRL includes a time limit, if the revocation applies for only a period of time, and a reason for the revocation.

A CRL is used to determine if a certificate is valid and trustworthy. A revoked certificate cannot be trusted. A digital certificate can be revoked for any of the following reasons: it was issued improperly, it is counterfeit, its private key is compromised, the issuing CA is compromised, the owner of the certificate no longer owns the domain for which the certificate was issued, the owner of the certificate has ceased operation or the original certificate was replaced with a different certificate from a different issuer.

SUMMARY

A particular CRL can be divided into a number of segments. The number of segments into which the CRL is divided can be determined by using a predefined number of serial numbers per segment. The number of serial numbers in a segment can be a number that results in a segment that is small enough to be efficiently stored and downloaded. The number of revoked serial numbers in the CRL can be divided by the predefined number of serial numbers per segment and rounded up to the next whole integer. The segment in which a particular certificate is included can be determined by application of a consistent hashing algorithm to the serial number of the certificate to determine in which segment the serial number will be found if revoked, thereby increasing the efficiency of determining the revocation status of the certificate.

Metadata associated with the CRL can be created and used with encryption and message authentication to preserve the tamper resistance property of the CRL despite it being separated into segments. Metadata associated with the CRL can be cached on each server and on a remote cache shared by all the servers in a region. The segments themselves can be cached in the remote cache. Storing the segments in the remote cache rather than in both the remote cache and in the local cache can decrease resource consumption on the local machine (e.g., by reducing the amount of memory used in the local cache). Storing the segments in the remote cache for a region enables the segments to be stored as close to the computer from which the request was received as is reasonably possible to optimize retrieval of the CRL by region. Metadata in addition to encryption and digital signing is used to make the cache (remote or local) tamper resistant.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A digital certificate is used to prove the ownership of a public key. Users of a public key need to be sure that the private key associated with the public key is owned by the subject with which an encryption or digital signature mechanism will be used. Such assurance is provided through the use of a public key (digital) certificate that binds the public key value to a subject, and can be implemented by having a trusted CA digitally sign the certificate. The most common format for public key certificates is defined by Standard X.509. The format can be further defined by profiles associated with particular use cases, such as the profiles in Public Key Infrastructure (X.509) as specified in RFC 5280.

A CRL (described in RFC 5280) includes a list of revoked certificate serial numbers issued by a particular CA. CRLs are typically difficult to maintain and are an inefficient method of distributing information in real time. When a CA receives a CRL request (e.g., from a browser), it can return a complete list of all the revoked certificates that the CA manages. Traditionally, the browser parses the list to determine if the certificate of the requested site has been revoked. Although the CRL may be updated as often as hourly, the time gap could allow a revoked certificate to be accepted, particularly because CRLs are cached because it is not feasible to get a current CRL each time a certificate is checked for revocation. Moreover, if the CRL is unavailable at the time the request is received, any operations depending upon certificate acceptance will be prevented and may result in a denial of service.

CAs may issue hundreds of thousands of certificates. As certificates are revoked, the size of a CRL can quickly expand to tens of megabytes in size, making online checking of CRLs challenging to perform quickly, especially in a multi-tenant environment. A multi-tenant environment refers to an environment in which a single instance of software runs on a server and serves multiple tenants. A tenant is a group of users who share a common access to the software instance. Multitenancy differs from a multi-instance architecture in which separate software instances operate for different tenants.

In a multi-tenant authentication system, a large number of transactions possibly invoking multiple CRLs may be processed at any given point in time. Each CRL may vary in size from a few kilobytes for a CRL with no revoked certificates to more than 20 megabytes for CAs that have issued large numbers of certificates. Downloading the CRL is a slow process, with the larger CRLs sometimes taking over 15 seconds to transfer and for validation to begin.

In tests, the 50th percentile of requests that needed CRL validation took over 1 second, with the 90th percentile taking over 4 seconds. This is far too slow for an efficient authentication service where a user expects sub 300 millisecond performance. A certificate based authentication service "in the cloud" can include thousands of servers in each region. Because a user is not able to control to which server the request is routed, each server ideally has to be able to retrieve the CRL in an efficient manner.

To make CRL validation efficient and performant, especially in a multi-tenant environment, in accordance with aspects of the subject matter disclosed herein, retrieved CRLs can be divided into segments of an appropriate size and compressed. Content of the segments can be refreshed in background to keep the CRLs up-to-date (current).

In the certificate based authentication system and method disclosed herein, authentication credentials based on certificates issued by a CA can be received by the certificate based authentication system. Each time a certificate derived from a credential is presented to the certificate based authentication system, the credential can be validated to determine its revocation status before an authentication decision is made. In accordance with aspects of the subject matter disclosed herein, authentication fails for a revoked certificate. The number of segments into which the CRL is divided can be determined by using a predefined number of serial numbers per segment. The number of serial numbers in a segment (e.g., 25,000 serial numbers per segment) may be chosen to make the segment a manageable size. The segment number within which a revoked serial number is included can be determined by taking the serial number modulo the number of segments into which the CRL is divided. Alternatively, any suitable hashing algorithm can be used. As used herein, the modulo operation is defined as: given two numbers a and n, a modulo n is the remainder after numerical division of a by n. Because only one segment has to be retrieved from cache and has to be searched for the certificate instead of the retrieving and searching the whole CRL, the efficiency of determining the revocation status of the certificate is increased.

Encryption and message authentication can be used to preserve the tamper resistance property of the CRL despite it being separated into segments. Moreover, because the CRL metadata specifies the total number of segments that should exist for the CRL and because segments themselves may contain 0 elements, if a segment is not found in either the local or remote cache, the information stored in the cache cannot be used because the data in the cache is no longer consistent with the CRL from which the data was derived.

Inconsistency between the CRL metadata stored in the cache and the CRL from which the CRL metadata was derived can arise because data was removed from the cache (e.g., the operating system may have reclaimed space from cache for correct operation of the system). The CRL metadata thus enables the use of volatile storage in which entries may be lost at any time.

Inconsistency between the CRL metadata stored in the cache and the CRL from which the CRL metadata was derived can arise because the cache has been tampered with. For example, a potential attacker may delete a segment to remove a serial number from the revocation list after the segments have been created. In this case, the CRL metadata may indicate there should be 11 segments but only 10 segments may actually exist. Inconsistencies prevent successful authentication.

Inconsistencies prevent successful authentication. When an inconsistency is detected, the CRL can be retrieved from the CRL Distribution Point. Thus, if an attacker were to tamper with a segment in an attempt to remove a serial number from the revocation list, the metadata or segment would fail to authenticate when it is read from the cache, causing the authentication server to retrieve the CRL from the CRL Distribution Point instead of using the cached data. Each individual entry in the cache, both metadata and segments, is, in addition, encrypted and then authenticated using shared secrets known only to the authentication servers.

Efficient Certificate Revocation List Validation in Multi-Tenant Cloud Services

Figure 1A:
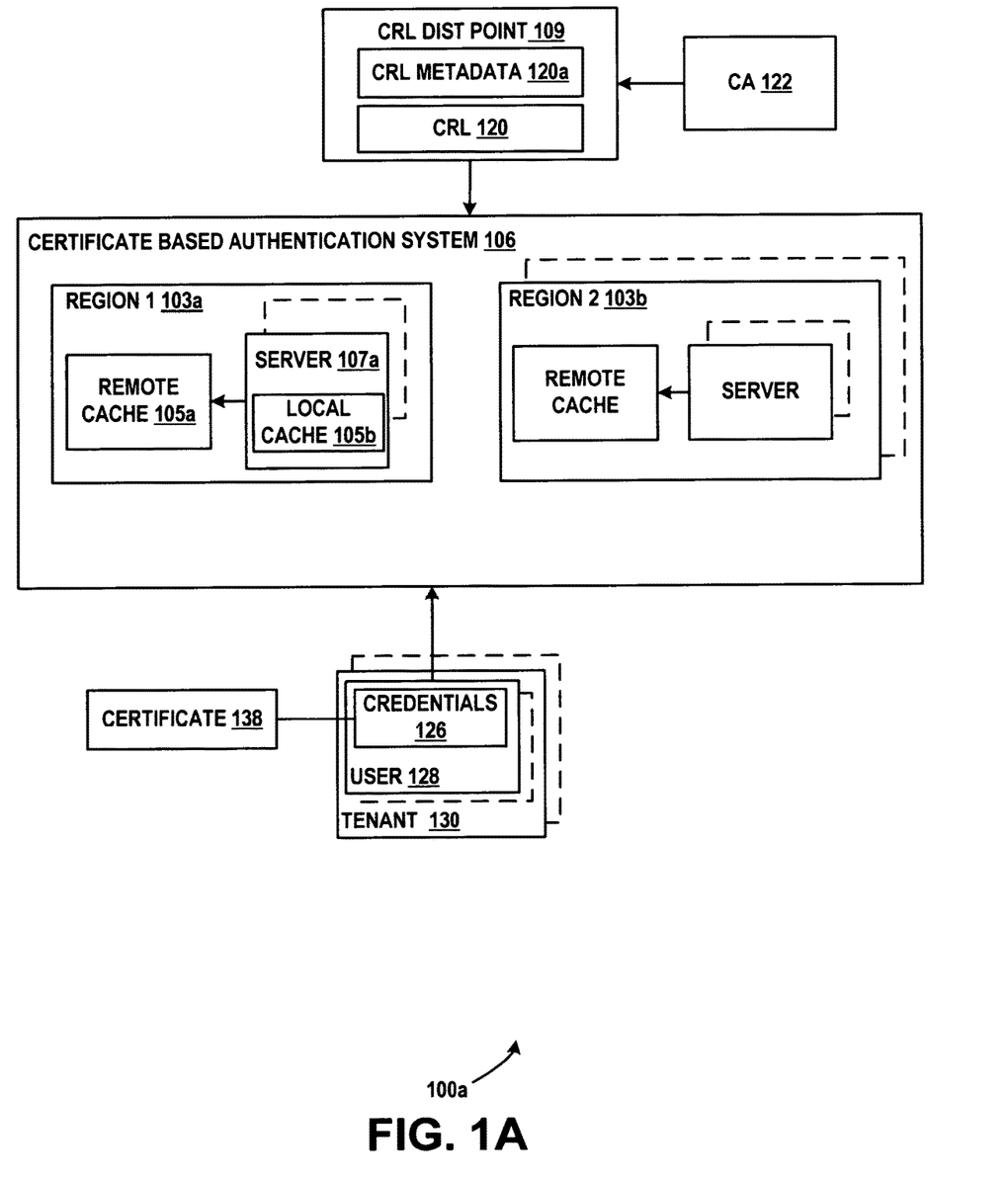
FIG. 1A is a block diagram 100a representing an example of a system that validates CRL revocations in accordance with aspects of the subject matter disclosed herein.

FIG. 1A is a block diagram representing an example of a system 100*a* that performs efficient CRL validation in accordance with aspects of the subject matter described herein. All or portions of system 100*a* may reside on one or more computers or computing devices such as the computers described below with respect to FIG. 3. System 100*a* may comprise a network of nodes where each node in the network comprises a computing device. System 100*a* or portions thereof may include information obtained from a service (e.g., in the cloud) or may operate in a cloud computing environment. System 100*a* may include regions such as region 1 103*a* and region 2 103*b*, etc. Each region may include one or more servers. For example, region 1 103*a* includes servers such as server 107*a*, etc. Each region can include a remote cache that serves all the servers in the region. For example, region 1 103*a* includes a remote cache 105*a* that serves servers such as server 107*a*, etc. in region 1 103*a*. Server 107*a*, etc. may include a local cache such as local cache 105*b*. A region can be a datacenter. A common CRL distribution point such as CRL distribution point 109 can serve all the regions in the system. A CRL such as CRL 120 can be maintained by a certificate authority such as certificate authority (CA) 122. CRL 120 can include or be associated and/or accompanied by CRL metadata such as CRL metadata 120*a*. In response to receiving a request from a user such as user 128, the certificate based authentication system 106 can be invoked. The user 128 can be a member of a tenant such as tenant 130. The user's request can be accompanied by or can include credentials such as credentials 126 from which a certificate for authentication such as certificate 138 is derived.

Figure 1B:
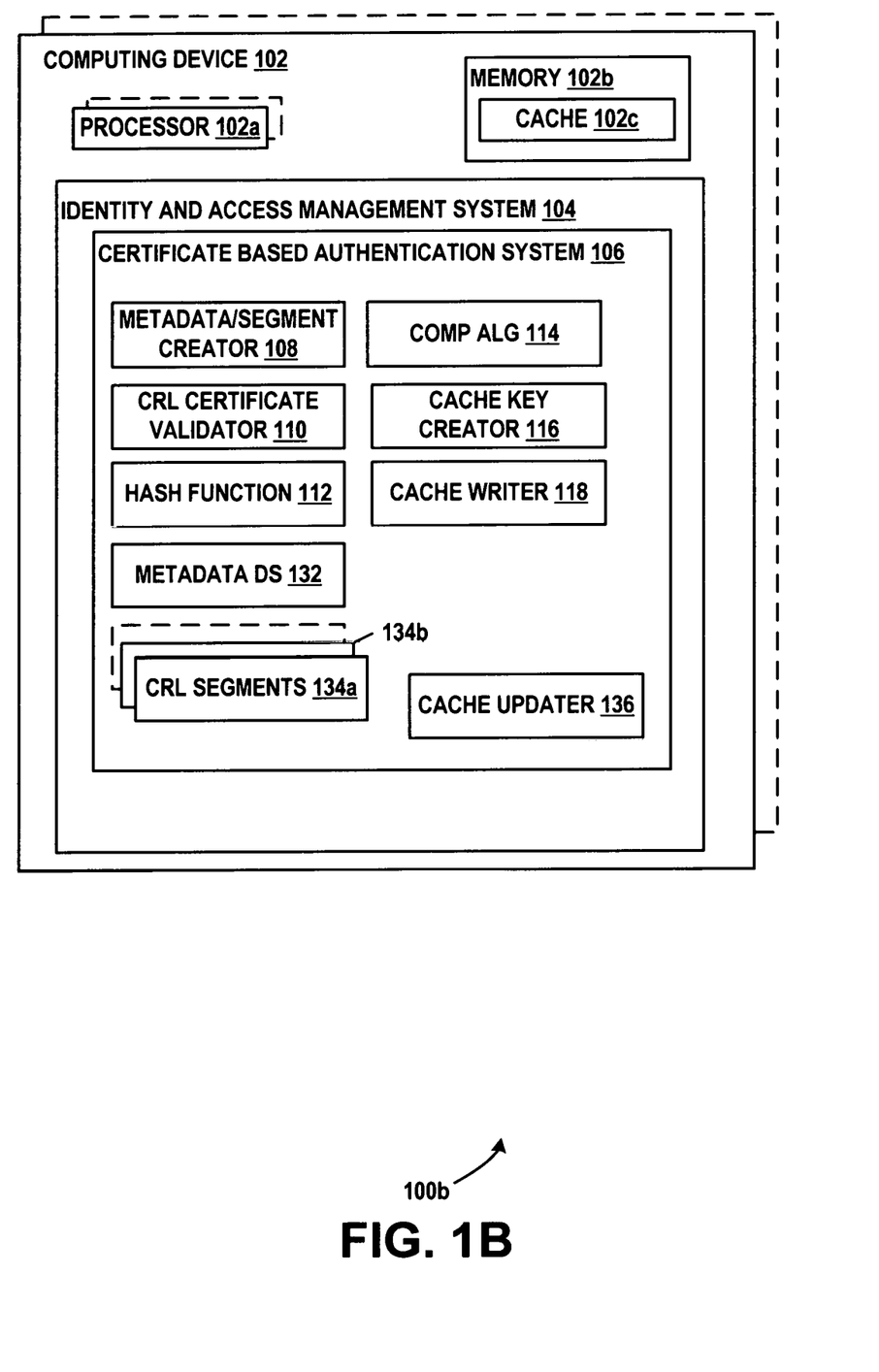
FIG. 1B is a block diagram 100b representing a more detailed example of a system that validates CRL revocations in accordance with aspects of the subject matter disclosed herein.

FIG. 1B is a block diagram representing an example of a system 100*b* that performs efficient CRL validation in accordance with aspects of the subject matter described herein. All or portions of system 100*b* may reside on one or more computers or computing devices such as the computers described below with respect to FIG. 3. System 100 or portions thereof may be provided as a stand-alone system or as a plug-in or add-in.

System 100*b* or portions thereof may include information obtained from a service (e.g., in the cloud) or may operate in a cloud computing environment. System 100*b* can include one or more computing devices. Contemplated computing devices include but are not limited to desktop computers, tablet computers, laptop computers, notebook computers, personal digital assistants, smart phones, cellular telephones, sensors, mobile telephones, servers, virtual machines, devices including databases, firewalls and so on. A computing device can include one or more processors and a memory that communicates with the one or more processors.

System 100*b* can include one or more computing devices such as computing device 102, etc. Each computing device can include one or more processors, and a memory connected to the processor(s). For example, in FIG. 1B, computing device 102 includes one or more processors such as processor 102*a*, etc., and a memory such as memory 102*b*. Memory 102*b* may include a cache such as cache 102*c*. System 100*b* may include one or more program modules which when loaded into the memory and accessed by the one or more processors configure the processor or processors to perform the actions attributed to the one or more program modules.

System 100*b* can comprise an identity and access management system such identity and access management system 104. Identity and access management system 104 can comprise one or more computing devices on which a certificate based authentication system such as certificate based authentication system 106 executes. Certificate based authentication software can comprise one or more of a CRL metadata/segment creator such as CRL metadata/segment creator 108, a CRL certificate validator such as CRL certificate validator 110, a hash function such as hash function 112, a compression algorithm such as compression algorithm 114, a cache key creator such as cache key creator 116, a cache writer such as cache writer 118 and/or a cache updater such as cache updater 136. Certificate based authentication software 106 can include a data store for metadata such as metadata datastore 132 and/or one or more CRL segments data stores such as CRL segments 134*a*, 134*b*, etc. Metadata datastore 132 and/or one or more CRL segments data stores such as CRL segments 134*a*, 134*b*, etc. can be stored in cache 102*c*.

Figure 1C:
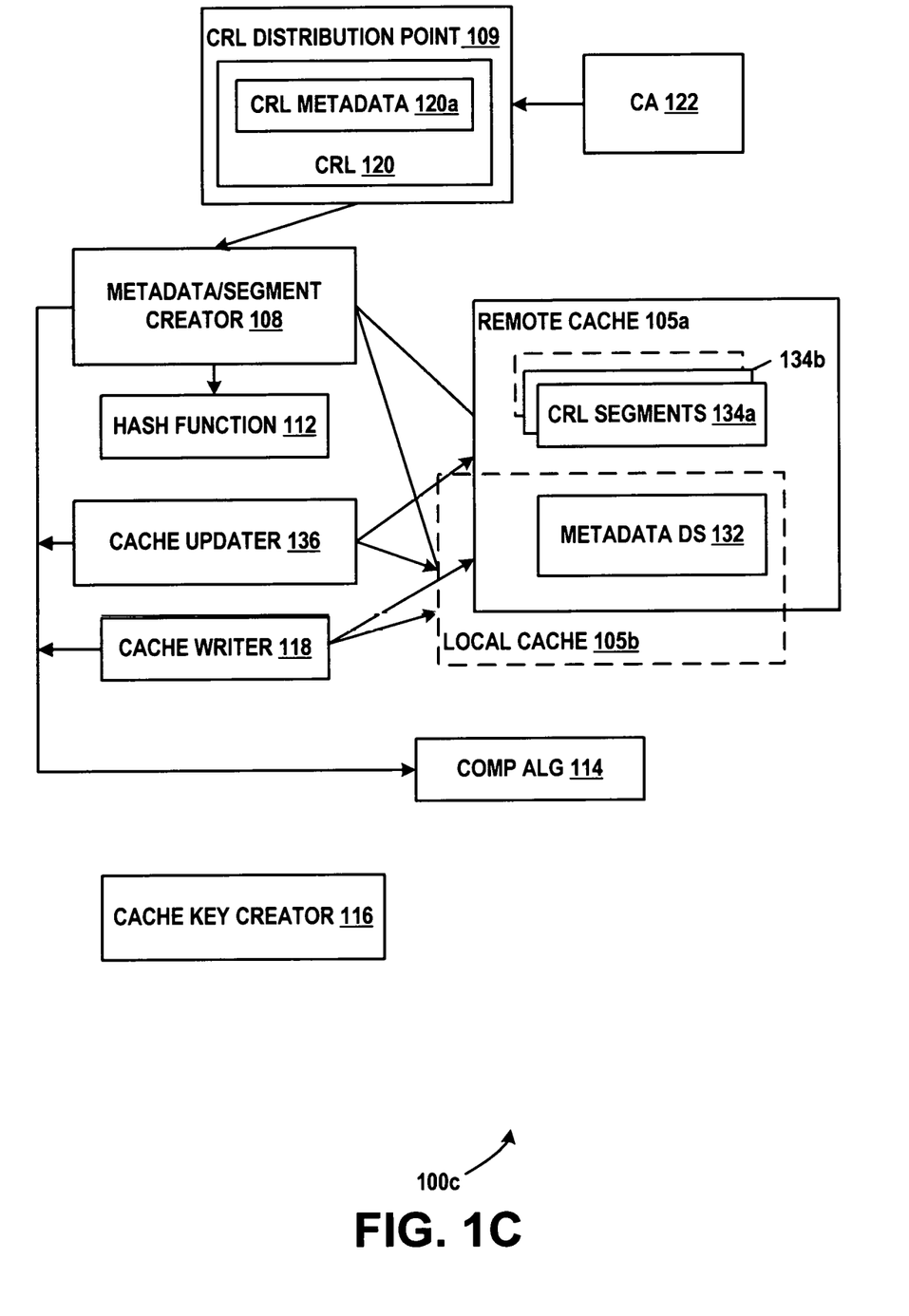
FIG. 1C is a block diagram 100c representing a more detailed example of a portion of a system that validates CRL revocations in accordance with aspects of the subject matter disclosed herein.

FIG. 1C illustrates an example of a CRL metadata/segment creator such as the metadata/segment creator illustrated in FIG. 1B, metadata/segment creator 108. Metadata/segment creator 108 can access and retrieve a CRL such as CRL 120 issued by a CRL issuer such as a certificate authority or CA (e.g., CA 122). CRL 120 can be associated with or can include CRL metadata such as CRL metadata 120*a*. The CRL issuer can be a CA or an entity authorized by the CA to issue CRLs. CAs publish CRLs to provide status information about the issued certificates. A CA may delegate this responsibility to another trusted authority. Each CRL can be associated with a particular scope. The scope can be the set of certificates that could appear on a particular CRL (e.g., "all certificates issued by CA X", "all certificates issues by CA X that have been revoked because of public key or CA compromise", "all certificates issued to the ABC employees locate in Seattle" and so on).

A CA such as CA 122 may issue new CRLs periodically. For example, a particular CA may issue a complete CRL every 30 days. A complete CRL lists all unexpired certificates within its scope that have been revoked for any reason. The CRL issuer may also periodically generate delta CRLs. For example, a particular CA may issue a complete CRL every 30 days and a delta CRL daily. A delta CRL lists certificates within its scope whose revocation status has changed since the issuance of a referenced complete base CRL. The scope of a delta CRL has to be identical to the scope of the base CRL to which it refers.

A CRL such as CRL 120 may be retrieved from a tenant's CRL Distribution Point such as CRL distribution point 109. The CRL 120 may be accompanied by or may include CRL metadata such as CRL metadata 120*a*. CRL 120 can be a base CRL or a delta CRL. CRL metadata/segment creator 108 can validate the signature and validity period of the CRL 120. In response to successful validation of the signature and validity period of the CRL 120, the metadata/segment creator 108 can create base metadata for the base CRL. CRL metadata/segment creator 108 can create delta metadata for the delta CRL. If the delta CRL cannot be used with the base CRL, the base CRL and/or delta CRL can be downloaded from the CRL distribution point 109. CRL metadata/segment creator 108 can attempt to validate the signature and validity period of the CRL 120. In response to successful validation of the signature and validity period of the CRL 120, the fields in the CRL metadata 120*a* can be copied out of the CRL 120 into a metadata object or data store such as metadata datastore 132 by CRL metadata/segment creator 108. CRL metadata/segment creator 108 can generate additional metadata from the CRL and store the generated metadata in the same or into a different metadata object or data store. The base metadata and/or the delta metadata can be stored in the remote and/or local cache. A metadata cache key can be created that uniquely identifies the current CRL for a given certificate authority. The additional metadata generated by the CRL metadata/segment creator 108 can include the number of segments created for a particular CRL and version of that CRL, as described below.

CRL metadata/segment creator 108 can create segments from the base CRL and/or from the delta CRL. The revoked serial numbers in the CRL 120 can be counted. The CRL 120 can be divided into a number of segments, each segment (e.g., CRL segment 134*a*, CRL segment 134*b*, etc.) including a configurable number of serial numbers per segment, such that once segmentation is completed, each segment has approximately the desired number of revoked serial numbers in it. In accordance with some aspects of the subject matter disclosed herein, the number of segments the segmented CRL has when segmentation is completed is no greater than the total number of serial numbers divided by the desired segment size. The number of segments can be stored in the metadata data store 132 or in a separate metadata data store. The particular segment in which a revoked serial number is placed can be determined by applying a hash function such as hash function 112 (such as but not limited to taking the serial number modulo the number of segments in the CRL) to the serial number. Each revoked serial number can then be placed into the segment indicated by the result of the hash. A segment cache key can be created by a segment cache key creator such as segment cache key creator 116 by concatenating the corresponding metadata cache key with the CRL serial number specified in the metadata and the segment number. This ensures that even if two servers were creating the segments and metadata at the same time, both servers generate the same data for a particular segment key.

To reduce the transmission and storage size of the CRL segments, each segment can be compressed by a compression/decompression algorithm such as compression algorithm 114 prior to being written to cache. The segments created by the metadata/segment creator 108 can be stored in remote cache. Storing the segments in the remote cache decreases resource consumption (e.g., amount of memory used) in the local cache such as local cache 105b. Storing the segments in the remote cache enables the segments to be stored as close to the computer from which the user request was received as is reasonably possible. However, the segments can be stored in local cache as well.

A cache writer such as cache writer 118 can write the compressed data into the remote and/or local cache. A cache updater such as cache updater 136 can update the cache 102c. The cache 102c can be updated when the CRL 120 is retrieved for the first time, or when the CRL 120 has expired. When the current date is past the Next Update date the CRL can no longer be used. The Next Update date is stored in the metadata associated with the CRL. When the Next Update date is passed, the CRL distribution point can be accessed for a more current CRL and the more current CRL can be downloaded. The CRL 120 can be retrieved from the CRL Distribution Point and the CRL segments and metadata can be formed as described above. The current certificate's revocation state can be validated as described above. In response to successful validation of the certificate, the CRL metadata and segments can be written to the local cache and to the remote caches on a separate thread, to allow the user request to complete before the data upload is complete. This is particularly helpful when the CRL is large. Data can be encrypted and authenticated to ensure the content cannot be tampered with while at rest in the remote cache. Moreover, CRL metadata can be accessed to ensure consistency between the metadata stored in the cache and the CRL from which the metadata was created as described above.

The cache can be updated in the background when it is eligible to be updated according to the Next Publish date. If the Next Publish date (stored in the metadata associated with the CRL), has passed, the CRL distribution point should have a new (more current) CRL but the new CRL is not required to be used. In this case, the certificate's revocation state can be checked against the still valid cache values as described above. In response to successful validation, a separate thread can be initiated to download a current CRL from the CRL Distribution Point. The current metadata and segments can be persisted to the caches. Because updating the CRL is performed in background when a more current CRL is available, not in response to a user request, a user will very rarely, if ever, need to be paused while the CRL is downloaded when waiting for a response to the user request. Data can be encrypted and authenticated to ensure the content cannot be tampered with while at rest in the remote cache.

Figure 1D:
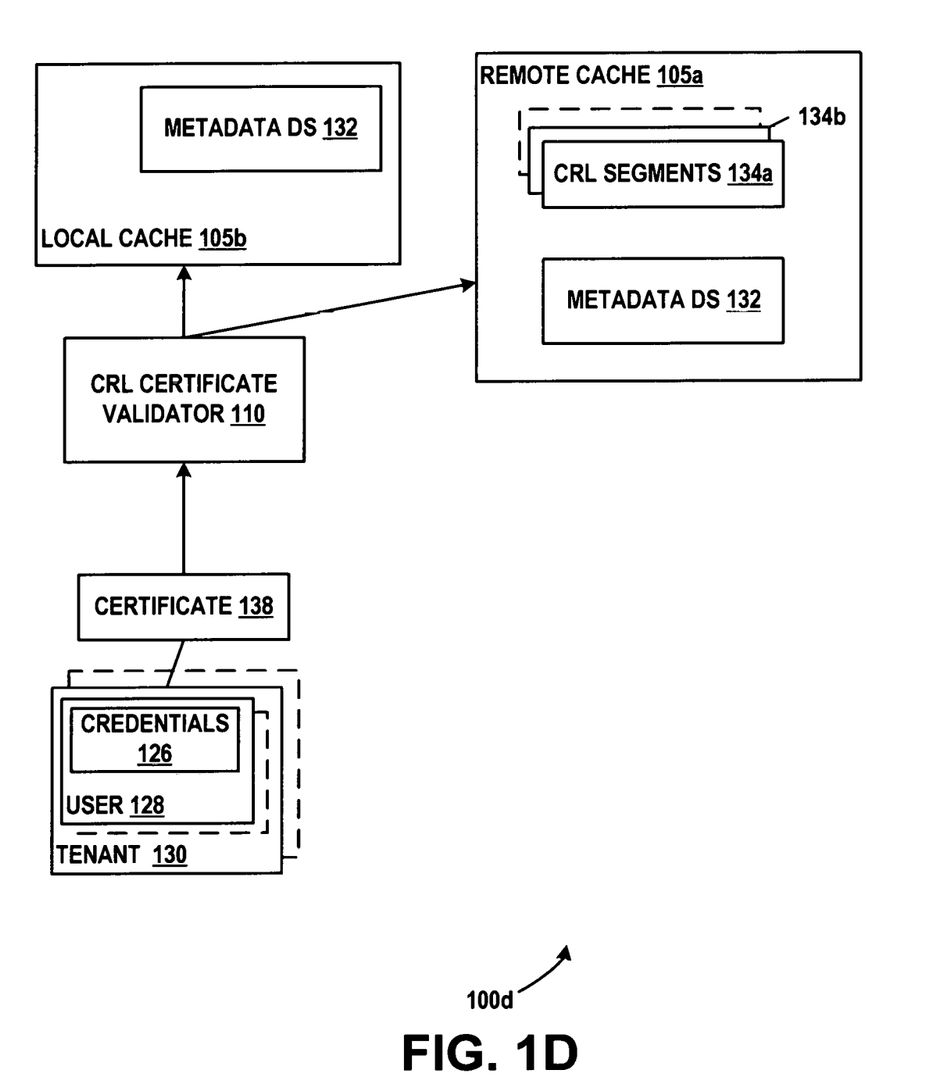
FIG. 1D is a block diagram 100d representing a more detailed example of a portion of a system that validates CRL revocations in accordance with aspects of the subject matter disclosed herein.

FIG. 1D illustrates an example of a CRL certificate validator such as CRL certificate validator 110. In response to receiving a user request from a user such as user 128 including a digital certificate such as certificate 138, the system can validate the CRL signature, validity period of the certificate and can determine whether the certificate could possibly be revoked. CRL certificate validator 110 can obtain the issuer information of the certificate to validate, and the serial number of the certificate to validate. The CRL metadata lookup key can be generated so that the certificate can be located in cache. In accordance with some aspects of the subject matter disclosed herein, the metadata lookup key can be created by concatenating with a separator character the issuing CA certificate's serial number, the issuing CA certificate's digital signature, the type of CRL (Base or Delta), and a constant value.

The constant value can specify the cache value format to prevent invalid data being read if the cache data format is changed. The constant value is associated with the layout of the data in the cache. For example, suppose the segments need to be made smaller. Doing so changes the hash calculation. The constant value indicates this change so that valid results are still returned. If the metadata lookup key is found in the local server's cache the metadata can be retrieved from the local server's cache. If the metadata lookup key is not found in the local server's cache, the remote cache can be accessed. If the metadata lookup key is found in the remote server's cache, the metadata can be retrieved from the remote server's cache. If the metadata lookup key is not found in the remote server's cache, the CRL can be accessed and retrieved from the tenant's CRL Distribution Point and formed into the metadata and CRL segments as described above. Limits on the size of the CRL retrieved can be set. Limits on the time allotted to the CRL retrieval can be set. If either or both limits are exceeded, the request can be unfulfilled. This prevents an attacker from launching many CRL validation requests that will consume all threads on the server or exhaust the server's memory downloading CRLs. Upon retrieval of compressed CRL segment data to local cache such as local cache 102c, the compressed segments can be decompressed. Compression of the CRL segments reduces latency to retrieve each segment from the remote cache and reduces contention on the shared remote cache.

The CRL certificate validator 110 can validate that the validity period of the returned metadata has not been exceeded. If the validity period is successfully validated the cached CRL can be used. If the validity period has been exceeded the authentication process cannot proceed. If the validity period is successfully validated, the number of segments is determined. If no segments are defined for the CRL and the number of segments for the CRL is 0, the CRL is empty and the certificate being validated is not revoked. If the CRL does include one or more segments, the segment in which the certificate would be found if it were revoked is determined by application of the constant hash function to the serial number. The segment indicated can be retrieved from the remote cache. If the retrieved segment retrieved from the remote cache includes the serial number in question, the certificate is revoked and the request for authentication fails. Otherwise, the serial number is not revoked, and authentication process proceeds and authentication succeeds if all other service policies are satisfied.

Throughout the validation process, all data retrieved from the remote cache is authenticated and decrypted before it is used, using a set of shared secrets that are delivered to all servers in the region, preventing anyone who can gain access to the remote cache server (such as operations or engineering personnel) from being able to modify or remove CRL metadata or segments to allow unauthorized access.

Figure 2A:
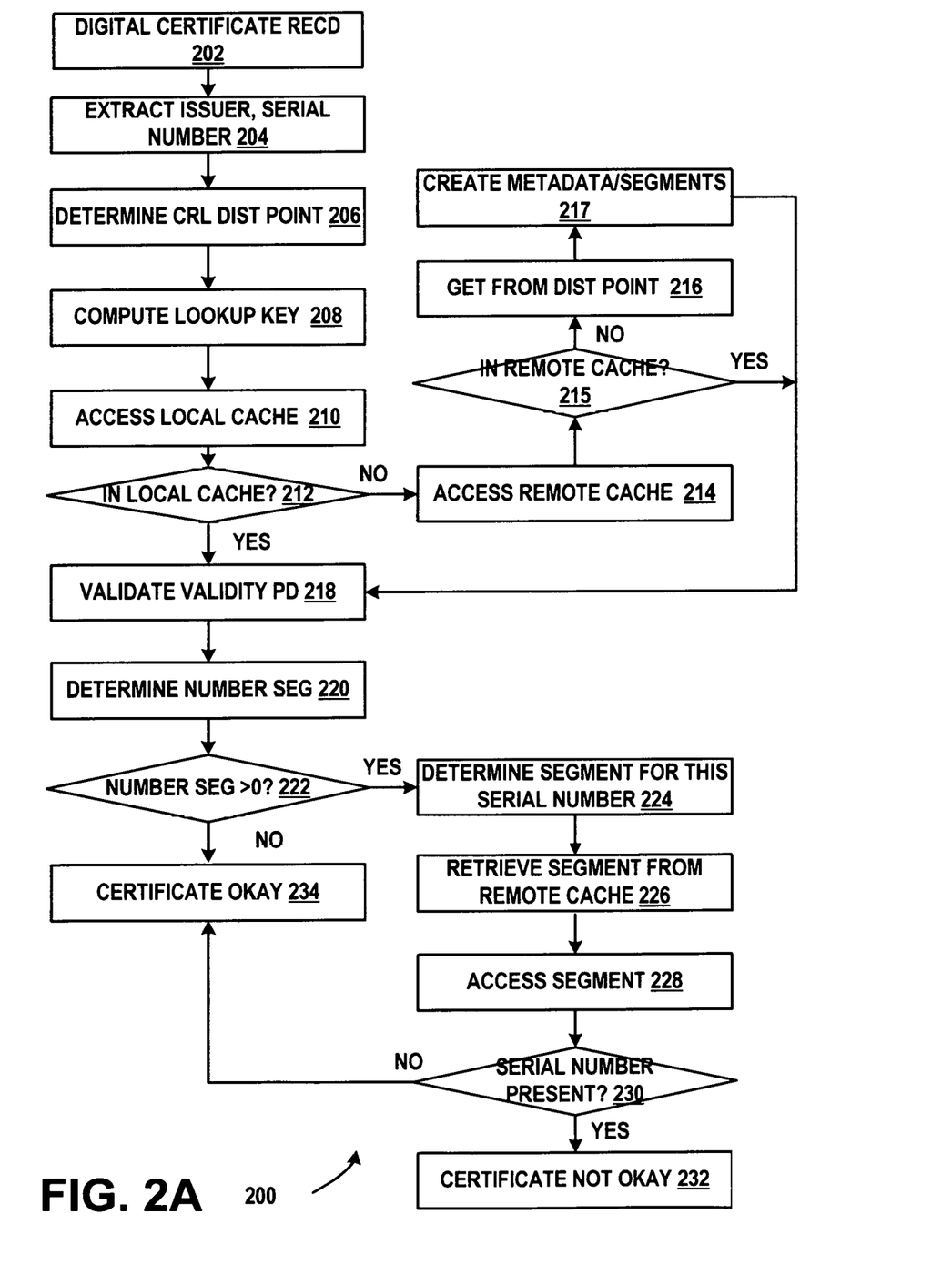
FIG. 2A illustrates an example of a method 200 that validates CRL revocations in accordance with aspects of the subject matter described herein.

FIG. 2A illustrates an example of a method 200 that performs efficient CRL validation in accordance with aspects of the subject matter disclosed herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100a, system 100b, system 100c and/or system 100d as described above.

At operation 202 a digital certificate can be received by a certificate based authentication system such as but not limited to certificate based authentication system 106 described in FIG. 1A. At operation 204 a validation process can begin. At operation 204 issuer information of the certificate to validate and the serial number of the certificate being validated can be extracted from the certificate. At operation 206 the CRL distribution point(s) for the certificate authority that issued the certificate can be determined. Although the address (e.g., a URL) of the CRL distribution point is included in the certificate itself, checking the stored address of the CRL distribution point provides the benefit of an additional level of tamper resistance because a tampered with certificate could have an incorrect CRL distribution point. The administrator of a tenant can configure the approved CRL distribution point location for the CRL. The URL for the CRL distribution point location for each CRL can be stored in a database for the application. The database can be included in the configuration settings for the application.

At operation 208 a CRL metadata lookup key can be computed by concatenating with a separator character (e.g., "_" or any other separator character) the issuing CA certificate's serial number, and the issuing CA certificate's thumbprint (e.g., digital signature). The lookup key may also include the type of CRL (Base or Delta). The lookup key may also include a constant value used to describe the cache value format. The cache value format value can be used to prevent the invalid data being read if the cache data format is changed.

At operation 210 the local server's cache can be accessed to see if the metadata is present. In response to determining at operation 212 that the local cache does not include the metadata, the remote cache can be accessed at operation 214. If in response to determining at operation 215 that the metadata is not included in the remote cache, the CRL can be accessed and retrieved from the customer's CRL Distribution Point at operation 216. The CRL can be used to create the metadata and segments at operation 217. Limits on the size and time allotted to the CRL retrieval can be established, which if exceeded, result in failure of the request, preventing an attacker from launching many CRL validation requests that may consume all threads on the server or exhaust the server's memory by downloading CRLs.

If in response to determining at operation 215 that the metadata is included in the remote cache processing can continue at operation 218. At operation 218 the validity period of the CRL can be validated to ensure that the cached CRL can still be used. In response to successful validation of the validity period, at operation 220, the number of segments can be determined. At operation 222 in response to determining that no segments are defined for the CRL, the CRL is empty and the certificate being validated is not revoked at operation 234. At operation 222 in response to determining that there are segments defined for the CRL, the segment that would contain this certificate's serial number were it to be revoked is determined at operation 224. At operation 226 that segment can be retrieved from the remote cache. At operation 228 the retrieved segment is accessed. In response to determining at operation 230 that the retrieved segment includes the serial number in question, the certificate is determined to be revoked and the request for a token is rejected. At operation 232 in response to determining at operation 230 that the retrieved segment does not include the serial number in question, the certificate is determined to not be revoked, and the authentication process can proceed.

Figure 2B:
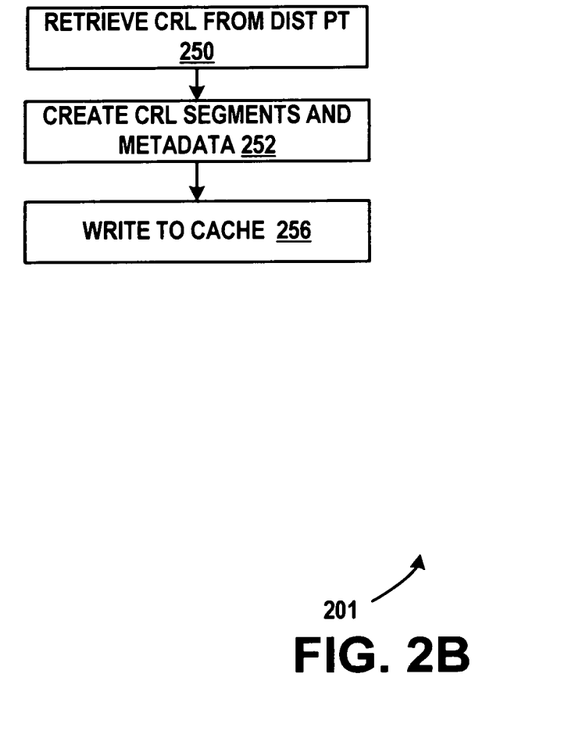
FIG. 2B illustrates an example of a method 201 that updates cache in accordance with aspects of the subject matter described herein.

FIG. 2B illustrates an example of a method 201 that updates cache in accordance with aspects of the subject matter disclosed herein. While method 201 describes a series of operations that are performed in a sequence, it is to be understood that method 201 is not limited by the order of the sequence depicted. For instance, some operations may occur in a different order than that described. In addition, one operation may occur concurrently with another operation. In some instances, not all operations described are performed. In some instances, not all operations performed are illustrated. Method 201 or portions thereof may be executed by a system or a portion of a system such as system 100 as described above.

Method 201 can be applied when a CRL is cached for the first time or is expired or can be updated as described more fully above. At operation 250 the CRL can be retrieved from the CRL Distribution Point. At operation 252 CRL segments and metadata can be created as described above. At operation 256 the metadata and segments can be written to the local and remote caches. This can be done on a separate thread, to enable a user request to complete before the data upload is complete. This is particularly important in the case of large CRLs.

Figure 2C:
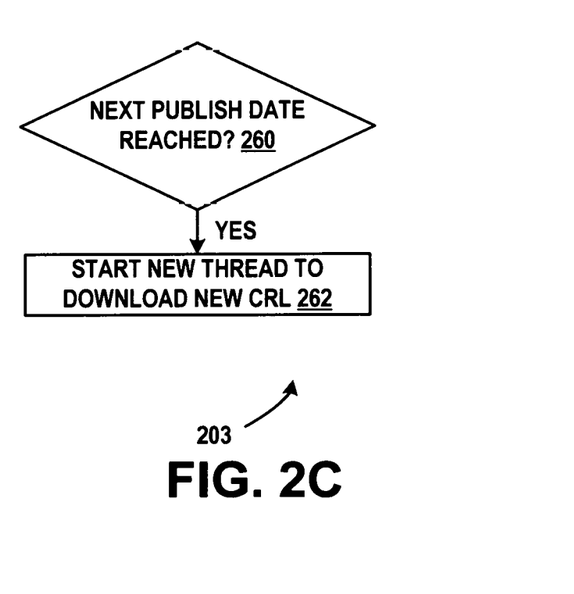
FIG. 2C illustrates an example of a method 203 that updates cache in accordance with aspects of the subject matter described herein.

FIG. 2C illustrates an example of a method 203 that updates cache in accordance with aspects of the subject matter disclosed herein. While method 203 describes a series of operations that are performed in a sequence, it is to be understood that method 203 is not limited by the order of the sequence depicted. For instance, some operations may occur in a different order than that described. In addition, one operation may occur concurrently with another operation. In some instances, not all operations described are performed. In some instances, not all operations performed are illustrated. Method 203 or portions thereof may be executed by a system or a portion of a system such as system 100 as described above.

Method 203 can be applied when a CRL has been retrieved before but is eligible to be updated according to the Next Publish date. At operation 260 the certificate's Next Publish date can be checked against the current date. At operation 262 in response to determining that the Next Publish dale has been reached, an additional thread can be initiated to download a new CRL from the CRL Distribution Point.

Disclosed herein is a system that validates CRL revocations efficiently. The system comprises a memory connected to a processor, the processor configured to access a CRL at a CRL distribution point, the CRL comprising a list of revoked certificates, divide the CRL into a plurality of segments, apply a hash function to a serial number of a certificate to determine a segment in which the certificate is placed, place the certificate in the determined segment, and store the segments in a tamper resistant remote cache, the tamper resistant remote cache serving a plurality of servers in a multi-tenant environment. The system can be configured to generate metadata for the CRL, the metadata comprising a number of segments created for the CRL and store the generated metadata in a local tamper resistant cache. The system can use a predefined quantity of serial numbers per segment to determine how many segments are created for the CRL. The system can comprise a plurality of regions, each region in the plurality of regions comprising a plurality of servers, wherein the tamper resistant remote cache in each region serves all the servers in the region. The CRL distribution point can serve the plurality of regions, each region in the plurality of regions comprising a plurality of servers. The system can be configured to refresh the plurality of segments in background to keep the CRLs up-to-date. The system can be configured to refresh the plurality of segments in background when a next date at which a current CRL is published is reached.

Disclosed herein is a method of validating a certificate efficiently comprising receiving a digital certificate by a processor of a computing device, generating a metadata lookup key for CRL metadata from information extracted from the digital certificate, accessing the CRL metadata in tamper resistant cache using the metadata lookup key, determining a segment associated with a serial number in the digital certificate, accessing the segment and in response to not finding the digital certificate in the segment, enabling authentication to proceed. If the serial number of the digital certificate in the segment, authentication fails. If local cache does not include the metadata, the tamper resistant remote cache can be accessed. If remote cache does not include the metadata, a CRL distribution point for the CRL can be accessed. The method can verify that a validity period of the CRL metadata has not been exceeded. If no segments are defined for the CRL, the certificate is valid.

Disclosed herein is a computing device for validating CRL revocations comprising a memory connected to a processor, and a CRL metadata/segment creator that accesses a CRL, generates metadata for the CRL, stores the generated metadata in tamper resistant cache and divides the CRL into a plurality of segments, a segment of the plurality of segments comprising a serial number of a certificate that has been revoked. The CRL metadata/segment creator can place the serial number of the certificate in a segment determined by taking the serial number modulo a number of segments into which the CRL is divided. The CRL metadata/segment creator stores the plurality of segments in the tamper resistant remote cache, wherein the tamper resistant remote cache serves a plurality of servers. The certificate validator can receive a certificate; compute a metadata lookup key from the certificate, access metadata in tamper resistant cache using the metadata lookup key, determine a segment associated with a serial number of the digital certificate, access the segment; and in response to not finding the serial number of the digital certificate in the segment, allow authentication to proceed. In response to finding the digital certificate in the segment, authentication fails. The cache can be local. The cache can be remote.

Example of a Suitable Computing Environment

Figure 3:
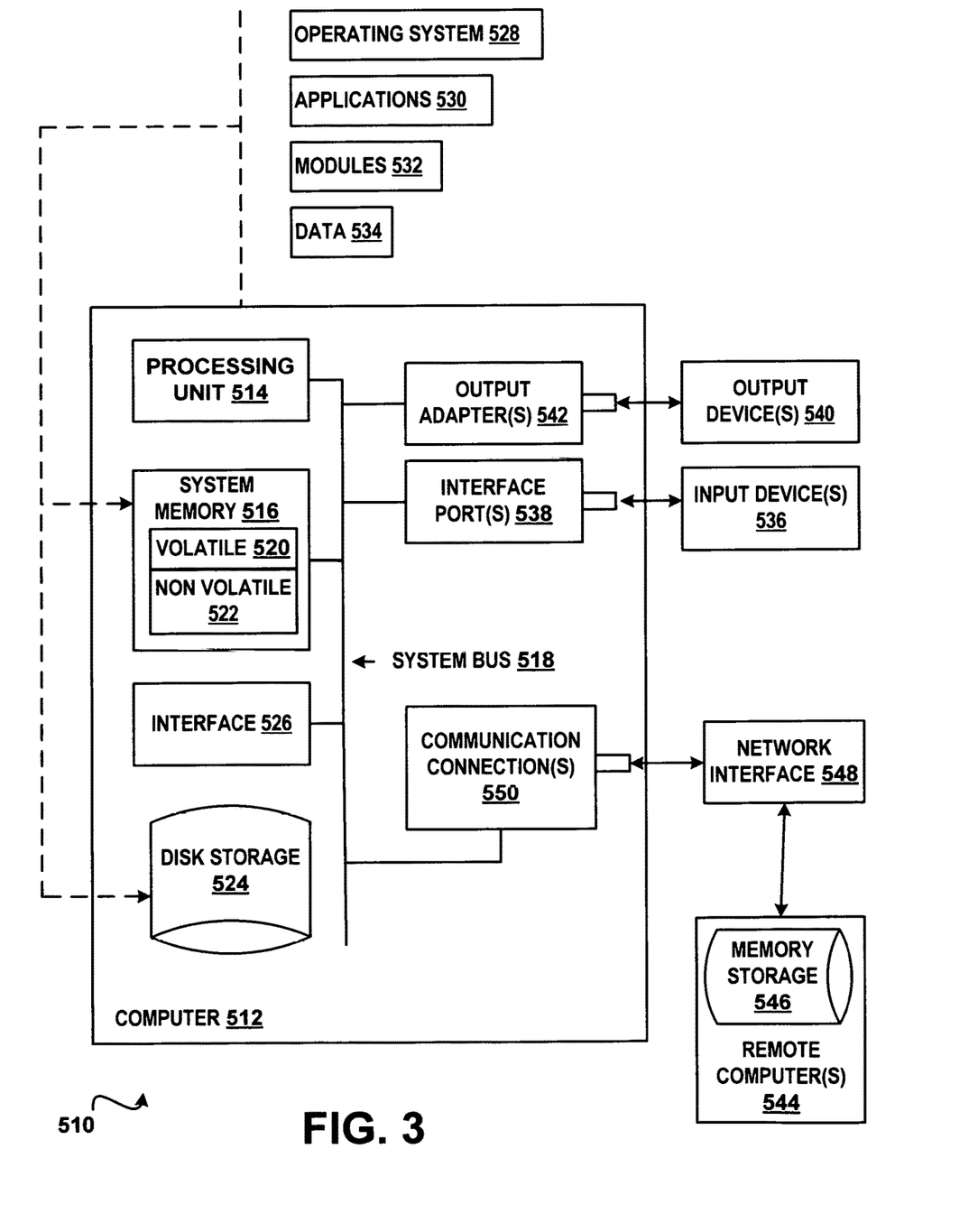
FIG. 3 is a segment diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system comprising:
a machine-readable medium connected to a processor,
wherein the machine-readable medium comprises computer-executable instructions which, when executed by the processor, cause the processor to:
access a certificate revocation list (CRL) at a CRL distribution point, the CRL comprising a list of revoked digital certificates;
divide the CRL into a plurality of segments;
apply a hash function to serial numbers of the revoked digital certificates to determine respective segments of the CRL in which individual revoked digital certificates are placed;
place the individual revoked digital certificates in the respective segments of the CRL; and
store the respective segments of the CRL in a plurality of tamper resistant remote caches, each tamper resistant remote cache serving the CRL to a plurality of servers in a multi-tenant environment on a segment-by-segment basis.

2. The system of claim 1, wherein the computer-executable instructions, when executed, cause the processor to:
generate metadata for the CRL, the metadata comprising a number of segments created for the CRL; and
store the generated metadata in a local tamper resistant cache.

3. The system of claim 1, wherein the computer-executable instructions, when executed, cause the processor to:

use a predefined quantity of serial numbers per segment to determine how many segments are created for the CRL.

4. The system of claim 1, the system comprising a plurality of regions, each region in the plurality of regions comprising respective servers, wherein respective tamper resistant remote caches in each respective region serve the respective servers in the respective region.

5. The system of claim 1, the system comprising a plurality of regions, wherein the CRL distribution point serves the plurality of regions, each region in the plurality of regions comprising respective servers.

6. The system of claim 1, wherein the computer-executable instructions, when executed, cause the processor to:
refresh the plurality of segments in background to keep the CRL up-to-date.

7. The system of claim 1, wherein the computer-executable instructions, when executed, cause the processor further to:
refresh the plurality of segments in background when a next date at which a current CRL is published is reached.

8. A method comprising:
receiving a digital certificate by a processor of a particular server;
generating a metadata lookup key for certificate revocation list (CRL) metadata from information extracted from the digital certificate;
accessing the CRL metadata in a tamper resistant remote cache using the metadata lookup key, wherein the tamper resistant remote cache is configured to serve a CRL to the particular server and one or more other servers on a segment-by-segment basis;
determining a particular segment associated with a serial number in the digital certificate;
retrieving the particular segment from the tamper resistant remote cache; and
in response to not finding the digital certificate in the particular segment, enabling authentication to proceed.

9. The method of claim 8, further comprising:
in response to finding the serial number of the digital certificate in the particular segment, causing authentication of the digital certificate to fail.

10. The method of claim 8, further comprising:
applying a hash function to the serial number of the digital certificate to determine the particular segment.

11. The method of claim 10, further comprising:
in response to determining that the tamper resistant remote cache does not include the CRL metadata, accessing a CRL distribution point to obtain the CRL.

12. The method of claim 8, further comprising:
verifying that a validity period of the CRL metadata has not been exceeded.

13. The method of claim 8, further comprising:
in response to determining that no segments are defined for the CRL, determining that the digital certificate is valid.

14. A computing device comprising:
a machine-readable medium connected to a processor;
wherein the machine-readable medium comprises computer-executable instructions which, when executed by the processor, cause the processor to:
access a certificate revocation list (CRL);
generate metadata for the CRL;
stores the generated metadata in a tamper resistant remote cache;
divide the CRL into a plurality of segments, individual segments of the plurality of segments comprising individual serial numbers of individual revoked digital certificates; and
serve the CRL from the tamper resistant remote cache to a plurality of servers on a segment-by-segment basis.

15. The computing device of claim 14, wherein the computer-executable instructions, when executed, cause the processor to:
place a particular serial number of a particular revoked digital certificate in a particular segment of the CRL determined by taking the particular serial number modulo a number of segments into which the CRL is divided.

16. The computing device of claim 14, wherein the computer-executable instructions, when executed, cause the processor to:
apply a hash function to a particular serial number of a particular revoked digital certificate to determine a particular segment of the CRL in which to place the particular revoked digital certificate.

17. The computing device of claim 14, wherein the computer-executable instructions, when executed, cause the processor to:
receive a digital certificate;
compute a metadata lookup key from the digital certificate;
access the metadata in the tamper resistant remote cache using the metadata lookup key;
determine a particular segment associated with a serial number of the digital certificate;
access the particular segment; and
in response to not finding the serial number of the digital certificate in the particular segment, allow authentication of the digital certificate to proceed.

18. The computing device of claim 17, wherein the computer-executable instructions, when executed, cause the processor to:
cause authentication of the digital certificate to fail in response to finding the digital certificate in the particular segment.

19. The computing device of claim 14, wherein the computer-executable instructions, when executed, cause the processor to:
compress the plurality of segments stored in the tamper resistant remote cache.

20. The computing device of claim 14, wherein the computer-executable instructions, when executed, cause the processor to:
serve individual segments of the CRL to requesting devices in response to metadata lookup keys received from the requesting devices.

* * * * *